United States Patent

Morimoto et al.

[11] Patent Number: 5,825,096
[45] Date of Patent: Oct. 20, 1998

[54] ROOF MODULE AND STRUCTURE FOR ASSEMBLING THE SAME

[75] Inventors: Mitsuaki Morimoto; Masataka Nishijima; Keizo Nishitani, all of Shizuoka, Japan

[73] Assignee: Yazaki Corporation, Tokyo, Japan

[21] Appl. No.: 769,544

[22] Filed: Dec. 19, 1996

[30] Foreign Application Priority Data

Dec. 21, 1995 [JP] Japan .................................. 7-333184

[51] Int. Cl.$^6$ .................................................. B60K 35/00
[52] U.S. Cl. ............................. 307/9.1; 180/90; 280/752
[58] Field of Search ................................... 307/9.1, 10.1; 361/627, 749, 752; 296/37.7, 37.8, 214, 39.1; 280/835, 202, 752; 439/34, 43; 180/90; 359/574, 96.25

[56] References Cited

U.S. PATENT DOCUMENTS

| | | | |
|---|---|---|---|
| 4,100,372 | 7/1978 | Hypolite | 181/148 |
| 4,241,870 | 12/1980 | Marcus | 296/37.7 |
| 4,421,190 | 12/1983 | Martinson et al. | 180/90 |
| 4,818,010 | 4/1989 | Dillon | 296/37.7 |
| 4,867,798 | 9/1989 | Delphia et al. | 296/37.7 |
| 4,968,124 | 11/1990 | Decker et al. | 350/574 |
| 5,040,990 | 8/1991 | Suman et al. | 439/34 |
| 5,154,617 | 10/1992 | Suman et al. | 296/37.7 |
| 5,469,298 | 11/1995 | Suman et al. | 296/37.8 |
| 5,636,891 | 6/1997 | Van Order et al. | 296/37.7 |
| 5,650,929 | 7/1997 | Potter et al. | 439/34 |

FOREIGN PATENT DOCUMENTS

| | | |
|---|---|---|
| 04 53 611 A1 | 10/1991 | European Pat. Off. . |
| 35 29 660 C2 | 2/1986 | Germany . |
| 1-307180 | 12/1989 | Japan . |
| 5-207628 | 8/1993 | Japan . |

*Primary Examiner*—Jeffrey A. Gaffin
*Assistant Examiner*—Peter Ganjian
*Attorney, Agent, or Firm*—Armstrong, Westerman, Hattori, McLeland & Naughton

[57] ABSTRACT

The object of the present invention is to provide a roof module on which various electric accessories and control circuits therefore are mounted at the front portion of the ceiling of a motor vehicle at the driver's seat side, so that the installation of functional electric accessories such as a sunroof and of the control circuits are greatly simplified. Inner equipments, electric accessories such as an antenna, control unit, and the like are assembled on an assemblage board formed into a shape which is suited to mount at the front portion of the ceiling of a motor vehicle at the driver's side, and that connectors for making a connection with an external electric circuit are provided thereon. A pair of connectors, which simultaneously act as a fixture and engage with each other are provided on the assemblage board of the roof module, thereby the coupling of the assemblage board with the overhead mount as well as the connection of the circuits are simultaneously performed.

5 Claims, 12 Drawing Sheets

ROOF MODULE AND STRUCTURE FOR ASSEMBLING THE SAME

BACKGROUND OF THE INVENTION

1. Field of the Invention

The present invention relates to a module to be mounted on an upper part or the ceiling of a motor vehicle, which module is incorporating an assemblage board assembled with various inner equipments and electric accessories to be mounted in the motor vehicle, more specifically, to a roof module including the various inner equipments, electric accessories, control units and electric circuits therefore assembled on the assemblage board and to be mounted on the front and driver's side of ceiling of the motor vehicle, and further to the structure for assembling such roof module.

2. Description of the Prior Arts

In order to incorporate electric accessories such as a compartment lamp and to install electric wiring therefore in the ceiling of a motor vehicle, the accessibility of a worker has been limited due to a narrow confined compartment of the motor vehicle since he has been forced to mount the module in the overhead position by keeping his eyes to look upward all the times. Thus, the worker will soon be exhausted and can hardly continue his work for a long period of time.

Figure 13:
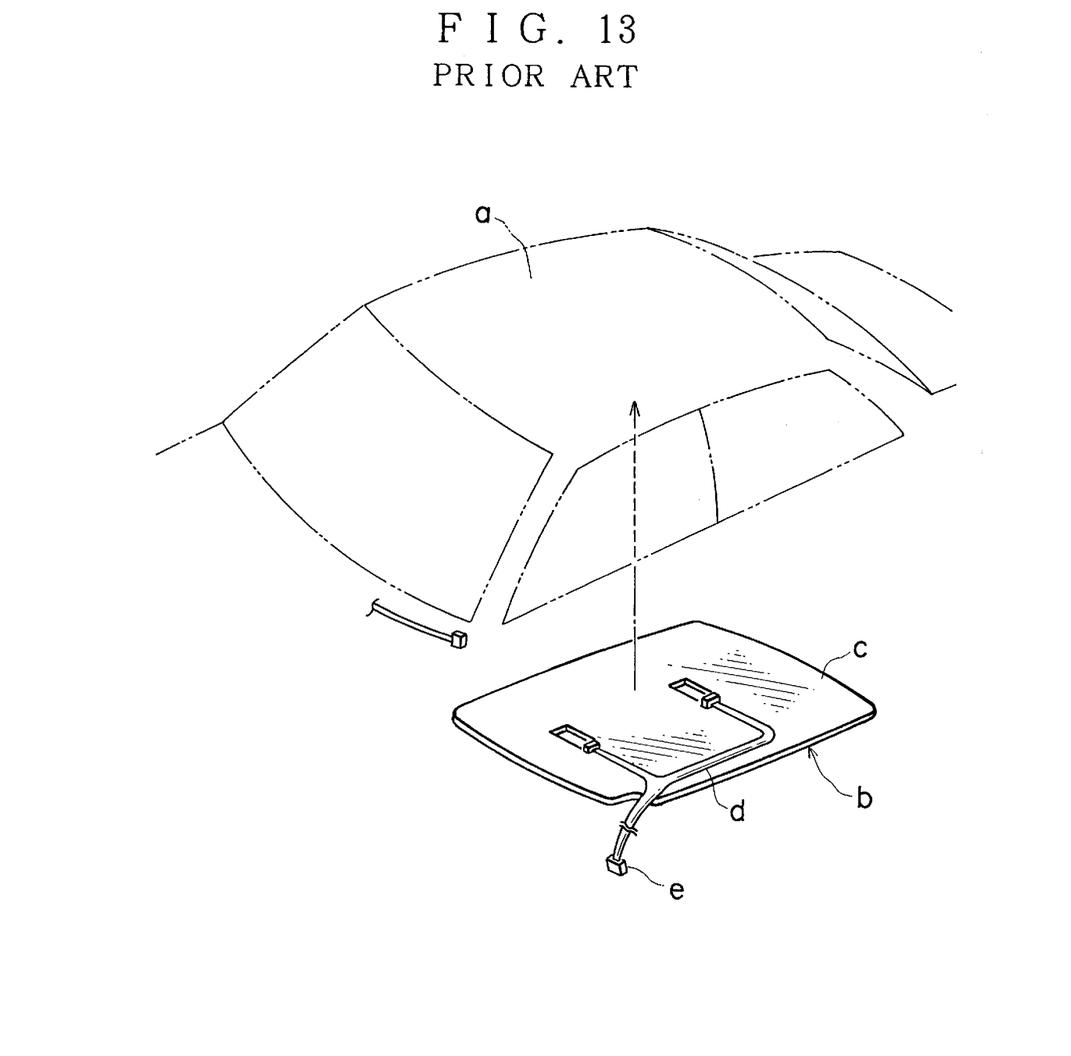
FIG. 13 is a perspective view of an assembled module to be attached to the ceiling of a motor vehicle.

One method for simplifying such work for reducing the exhaustion and improving the workability has been proposed in Japanese Patent Application Laid Open No. Hei 5-207628. According to this prior art method, as shown in FIG. 13, an assembled module b, on which electric wires and electric accessories are mounted in advance, is installed in the ceiling of a motor vehicle body a.

The assembled module b is formed by assembling various electric accessories, such as a compartment lamp and a map lamp, on an overhead mount or ceiling mount c which is made of a synthetic resin, and by using double-sided adhesive tape to attach a plurality of electric wires d which are to be connected with the electric accessories. According to the method disclosed in this prior art, since the assembled module b can be manufactured at a factory outside, etc., the work for installing the assembled module b to the ceiling of a compartment is limited only in the narrow confined compartment of a motor vehicle, thus the installation of the electric accessories and the wiring is simplified.

However, the assembled module b is considerably large in size because of the fact that the assembled electric accessories and wiring thereto are provided on the overhead mount c which is to be fixed to the ceiling of the motor vehicle body a, and the transportation and the installation of the assembled module b is complicated. Further, since it is necessary to use a connector e, lead out from the assembled module b, for connecting the electric wires d with the assembled module b and then to the main wire harness of the motor vehicle body, such work to be carried out within the narrow confined compartment of the motor vehicle is still difficult.

Since the assembled module b is manufactured by mounting electric accessories, such as a compartment lamp, and the electric wires on the overhead mount c, it has been difficult to mount on it a device such as a motor driven sunroof. In the conventional case, therefore, a sunroof must be independently attached to the ceiling of the motor vehicle body and that a control circuit for driving a motor with its operating device.

SUMMARY OF THE INVENTION

It is therefore an object of the present invention to eliminate the problems encountered with the prior art as described above and to provide a roof module, on which various electric accessories and control circuits therefore are collectively mounted at the front portion of the ceiling of a motor vehicle at the driver's seat side, so that the installation of functional electric accessories such as a sunroof and of the control circuits are greatly simplified, and so that additional installation and modification of the control circuits can be carried out with ease, the module has an excellent adaptability relative to many types of optional electric accessories and good workability of the module assembling.

To achieve the above objective, a motor vehicle roof module according to one aspect of the present invention, inner equipments, electric accessories and circuits therefore are mounted on an assemblage board having a shape which is suited to mount at the front portion of the ceiling of a motor vehicle at the driver's side, and that connectors for making a connection with an external electric circuit are provided thereon.

Preferably, an antenna for receiving electromagnetic waves for radio and for motor vehicle navigation is included as one of the electric accessories.

It is preferable that a lamp, a receiver, a multiplex control board and a switch assembly be provided as the electric accessories, and that a control unit be included for controlling the electric accessories.

According to another aspect of the present invention, it is preferable that an overhead mount is provided in parallel, at the ceiling of the motor vehicle, with the roof module as defined in the claims.

According to still another aspect of the present invention, it is desirable that the assemblage board of the roof module as defined in the claims is provided along side the overhead mount for installing the inner equipments of the motor vehicle and integrating the assemblage board and the overhead mount into one unit.

According to yet another aspect of the present invention, it is preferable that one of a pair of connectors, which simultaneously act as a fixture and engage with each other is provided on the assemblage board of the roof module defined in the claims, thereby the coupling of the assemblage board with the overhead mount and the connection of the circuits installed in the overhead mount with the circuits mounted on the assemblage board are simultaneously performed.

DETAILED DESCRIPTION OF THE PREFERRED EMBODIMENT

According to the present invention, an assemblage board is so shaped that it matches with a shape of the front portion of the ceiling in a motor vehicle on the driver's seat side, whereby inner motor vehicle equipments, electric accessories, circuits therefore and the like are assembled on the assemblage board. Thus, a roof module is arranged in such that the depth of which is considerably smaller than that of the conventional module. As a result, it is also possible to attach a sunroof to the ceiling of the motor vehicle body without changing the structure of the module, and a module can be manufactured in advance without considering types of optional electric accessories which may be mounted to the ceiling of the motor vehicle body. Therefore, it is easy to modify the configuration of the electric accessories to conform to the motor vehicle type and grade, and mounting of the accessories to the ceiling of the motor vehicle is greatly simplified.

The roof module of the present invention can be independently attached to a motor vehicle alongside an overhead mount. However, the roof module may be positioned at the front end of the overhead mount and be integrally joined with the overhead mount to form a unit body together with a rear-view mirror and sun-visor by using screws, and thus integrated assembly is mounted on the ceiling of the motor vehicle.

Figure 1:
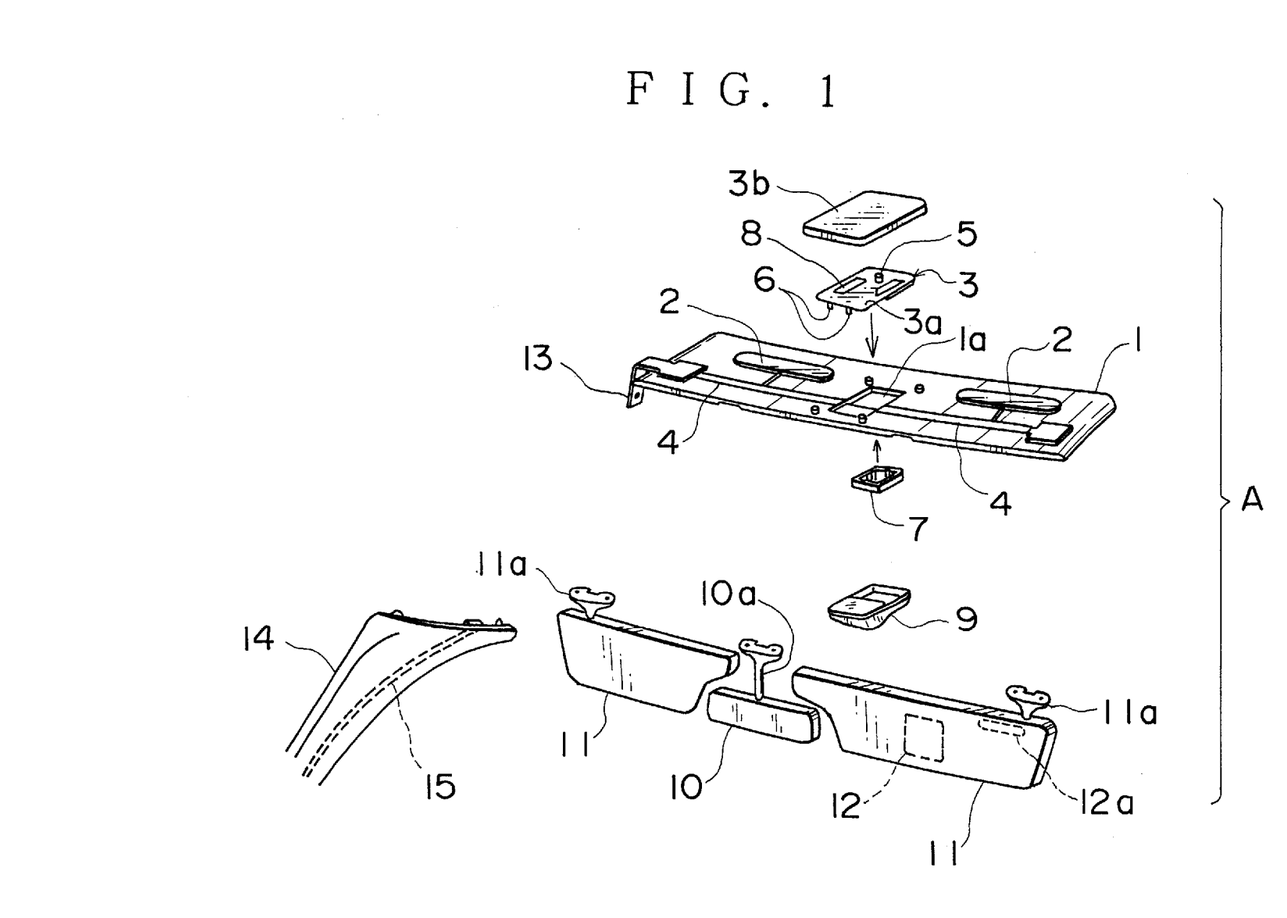
FIG. 1 is a disassembled perspective view of a roof module for a motor vehicle according to an embodiment of the present invention.

One embodiment of the present invention will now be described. FIG. 1 is a disassembled perspective view of a roof module A embodying the present invention.

The roof module A is so designed that there are provided on it various electric accessories, such as an antenna 2, a control unit 3, and wiring, such as a modular circuit block 4 which serves as a circuit conductor 4 for connecting the control unit 3 to the electric accessories.

The assemblage board 1, which constitutes a apart of the ceiling at the driver's seat side, i.e., the front portion of the ceiling of the motor vehicle, is a narrow plate and has a length of a fraction of the total length of the ceiling in a longitudinal direction.

The antenna 2 is used for receiving radio signals and GPS signals for motor vehicle navigation.

The control unit 3 has a unit board 3a on which a receiver 5 for keyless entry system, lamp 6, switch assembly 7 and multiplex control board 8 for controlling the lamp 6 and an inner rear-view mirror 10 are mounted and is fixed to an operating window 1a formed at the central part of the assemblage board 1. The control unit 3 is then covered from the top with a recessed cover case 3b and that from the bottom with a lamp cover 9 to form a unit, and this unit is fastened to the assemblage board 1 by using screws. The individual electric accessories can be operated by manipulation of appropriate switch of the switch assembly 7 mounted on the control unit 3.

The inner rear-view mirror 10 and the sun visor 11 are mounted respectively, as inner equipments, by using the fixtures 10a and 11a. The inner rear-view mirror 10 is an electric powered type for adjusting an angle through the rotation of a motor. A vanity mirror 12 and vanity lamp 12a are provided on the sun visor 11.

Since the modular circuit block 4 is connected to a connectors which is located in the fixed portion relative to the fixtures 10a and 11a, the connection for a motor for driving the inner rear-view mirror 10 and for supplying power for the vanity lamp 12a is enabled simultaneously with the mounting of the inner rear-view mirror 10 and the vanity lamp 12a.

A connector 13 connected to the modular circuit block 4 is provided at one end of the assemblage board 1, and is connected to a wire harness 15 which is retained in a front pillar 14 of the motor vehicle.

Figure 2:
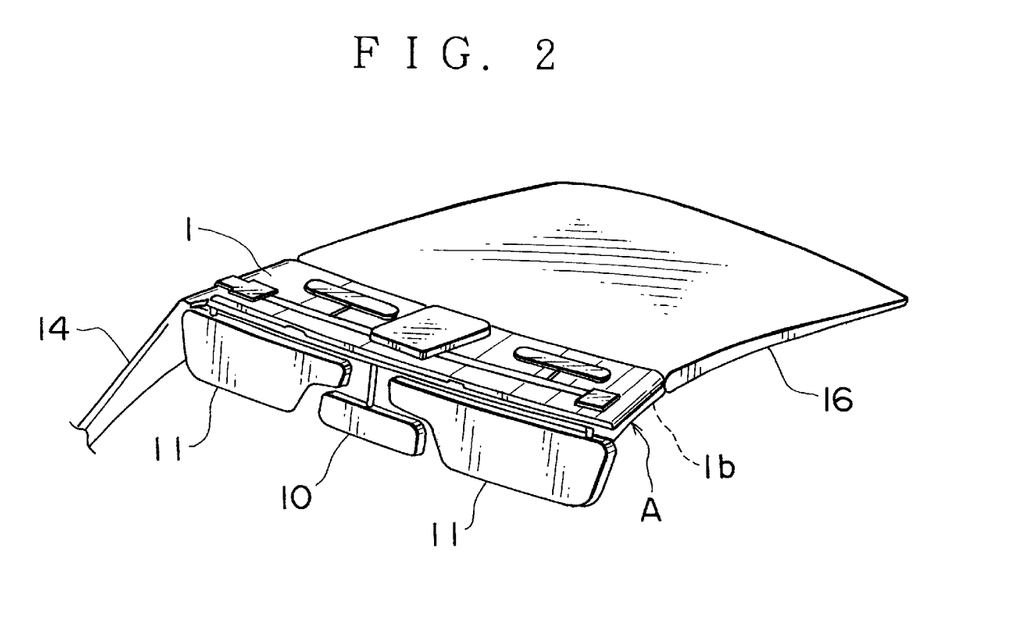
FIG. 2 is a perspective view showing a state of the roof module of FIG. 1 mounted on the ceiling of the motor vehicle.

As shown in FIG. 2, screws are used to fix the roof module A to the ceiling of the motor vehicle by abutting to the front portion of the overhead mount 16. Non-woven cloth, which is almost the same as being used for the overhead mount 16, is adhered to an inner surface 1b of the assemblage board 1 to form a part of the ceiling of the motor vehicle.

Figure 3:
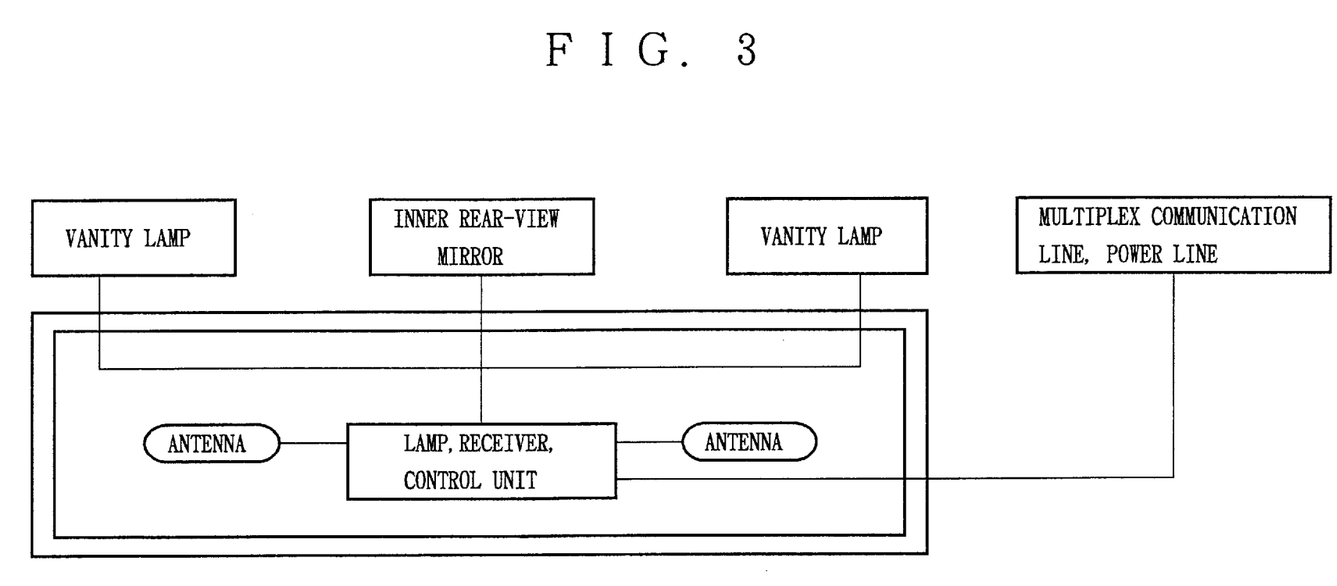
FIG. 3 is a system block diagram illustrating the roof module of FIG. 1.

FIG. 3 is a system block diagram showing a state of the roof module A being installed in the motor vehicle body.

Figure 4:
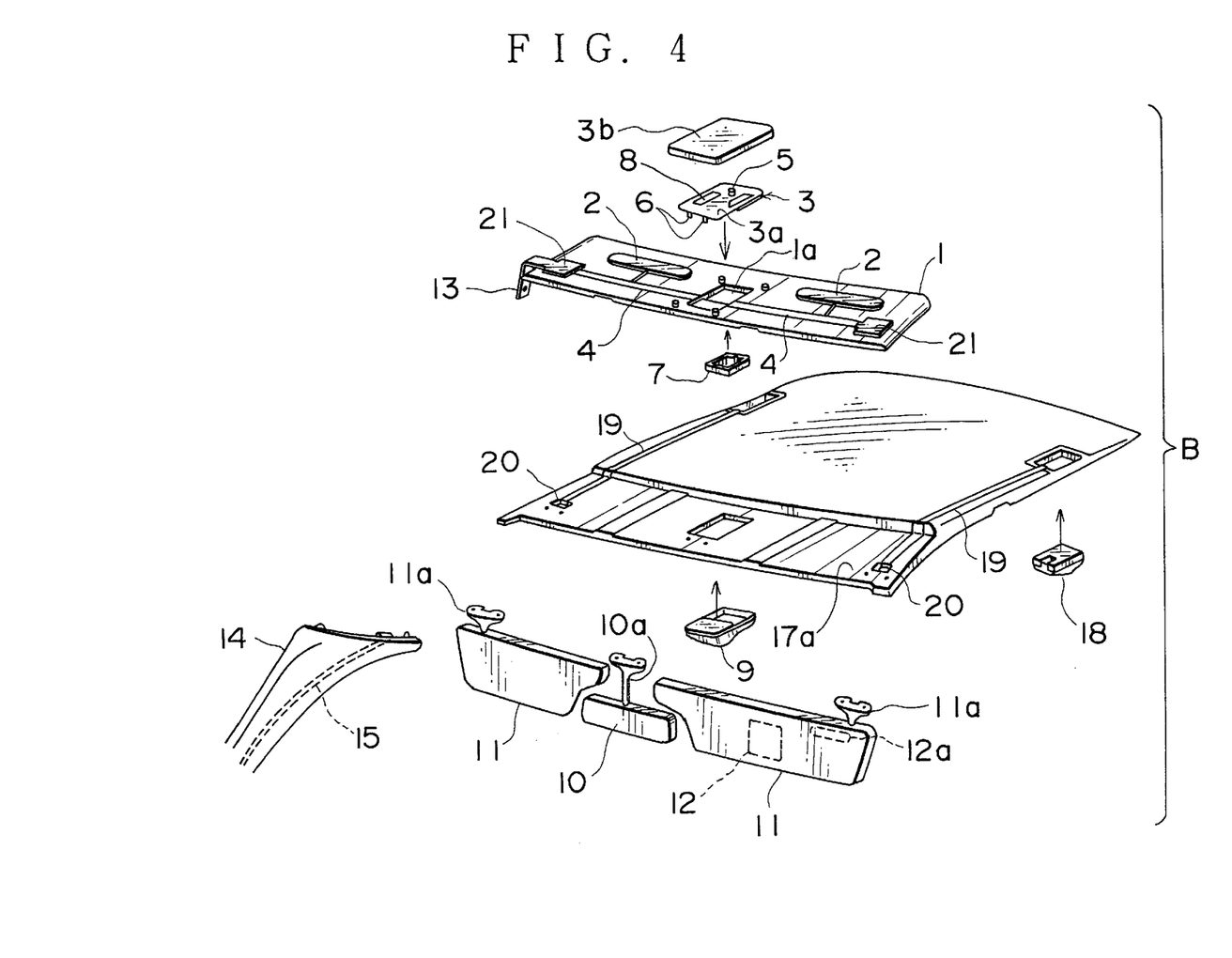
FIG. 4 is a disassembled perspective view of a roof module assembly of a motor vehicle according to the embodiment of the present invention.

FIG. 4 is a disassembled perspective view of an automatic roof module assembly B according to the embodiment of the present invention cited in claim 4.

The roof module B is of a structure having the assemblage board 1, which is similar to that of the roof module A, is united with an overhead mount 17 to be mounted on the entire surface of the ceiling of the motor vehicle, and electric accessories, inner equipments and the like are mounted thereon.

More specifically, the assemblage board 1 is placed on a module mounting recessed portion 17a formed at the front end of the overhead mount 17 and fixed thereat, so that the antenna 2 for a radio signal reception or for receiving GPS signals to be used in motor vehicle navigation, the control unit 3 and wiring system such as modular circuit block 4 which provides circuit conductors for connecting the control unit 3 and electric accessories are provided as in the roof module A.

The Inner accessories, such as an inner rear-view mirror 10 and the sun visor 11 which are also provided for the roof module A, are attached by using fixtures 10a and 11a from the bottom side of the module attaching recessed portion 17a. Since the modular circuit block 4 is connected to a connector which is provided at the fixing portion about the fixtures 10a and 11a, an operating circuit for the inner rear-view mirror 10 and an electric circuit for a vanity lamp 12a incorporated in the sun visor 11 are also connected simultaneously therewith to form an electric circuit when the room mirror 10 and the sun visor 11 are mounted. A connector 13 connected to the modular circuit block 4 is provided at one end of the assemblage board 1 and is connected with the wire harness 15 retained in the front pillar 14 of the motor vehicle body.

Electric wires 19 to be connected to rear personal lamps 18 are embedded along both side edges of the overhead mount 17 and, at the other ends of the electric wires 19, connectors 20 are mounted alongside the module mounting recessed portion 17a. The connectors 20 engage with connectors 21 connected to the modular circuit block 4, which block forms circuit conductors provided on the assemblage board 1, and connects the circuit of the assemblage board 1 to the electric wires 19 of the rear personal lamps 18.

When a sunroof is provided as an optional device in the ceiling of the motor vehicle, a circuit for opening and closing the sunroof can be installed in the ceiling. In this case, in the same manner as for the rear personal lamps 18, the circuit of the sunroof can be connected to the assemblage board 1 by means of a connector.

Figure 5:
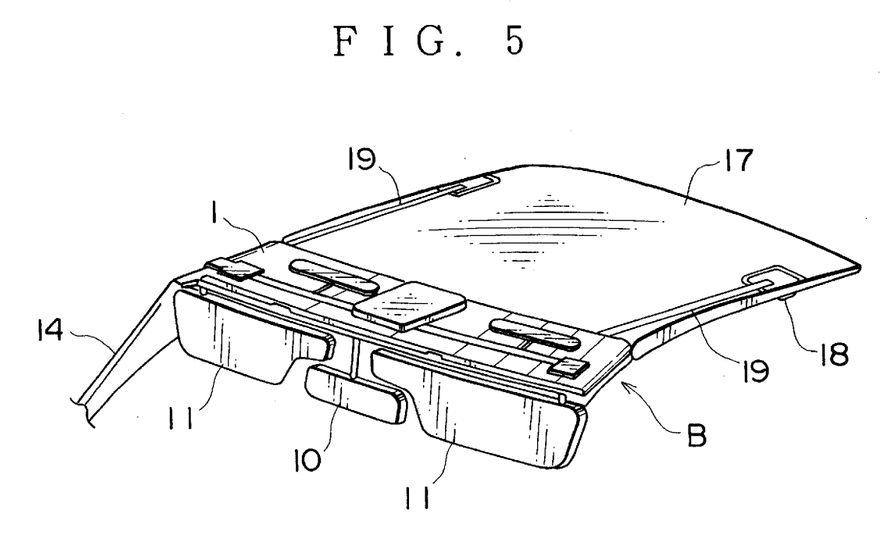
FIG. 5 is a perspective view showing a state of the roof module of FIG. 4 being attached to the ceiling of the motor vehicle.
Figure 6:
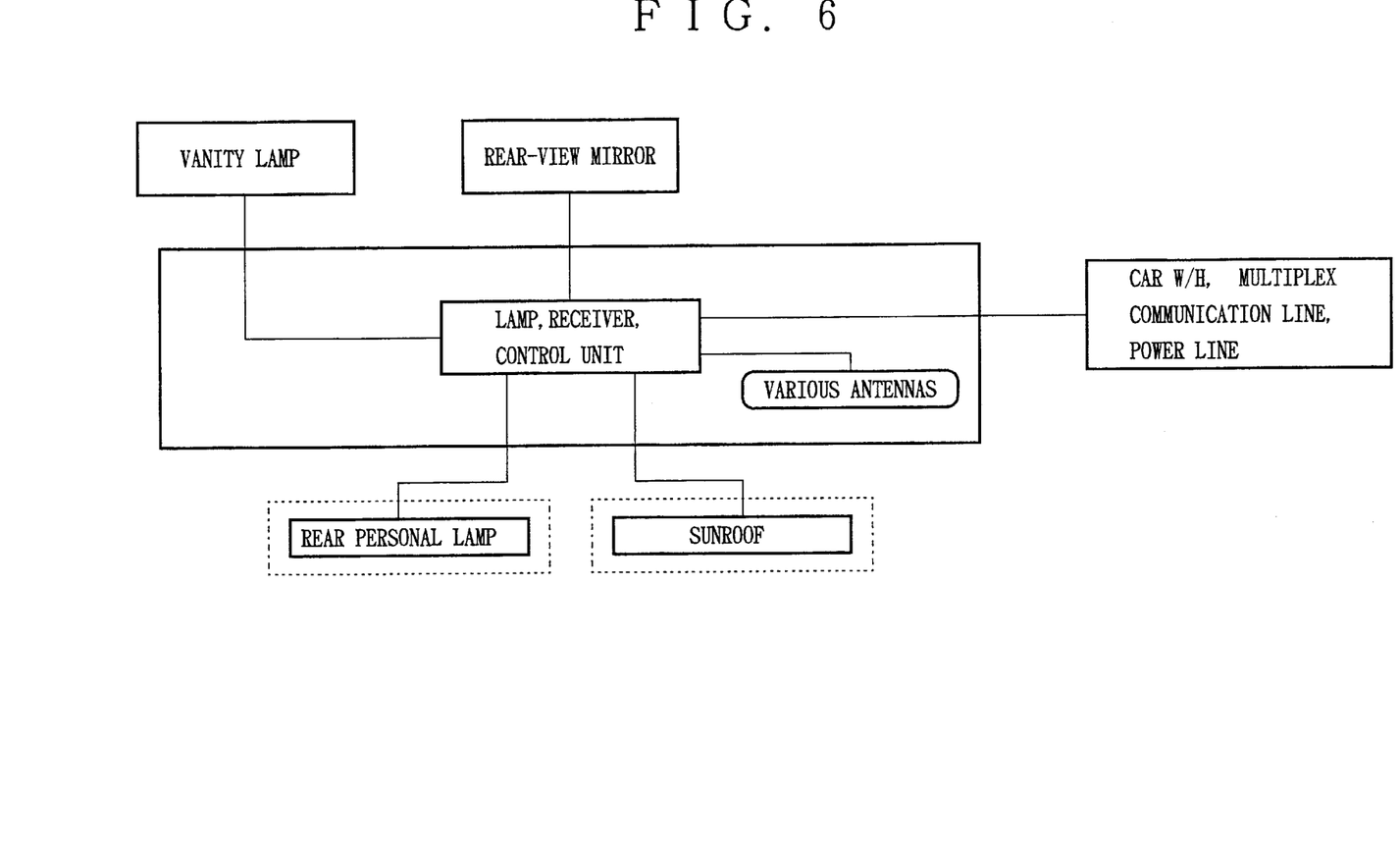
FIG. 6 is a system block diagram illustrating the roof module of FIG. 4.

FIG. 5 is perspective view showing a state of the roof module assembly B being mounted on the ceiling of a motor vehicle. A detailed structure of mounting the sunroof on the ceiling of the motor vehicle is not shown, however, the structure of the assembly can be easily seen. FIG. 6 is a system block diagram illustrating the state of mounting the roof module assembly B in the motor vehicle body.

The mounting of the roof module assembly B to the motor vehicle body can be done by merely fixing it to the ceiling of the motor vehicle with screws, and by connecting it to the connector of a front pillar.

Figure 7:
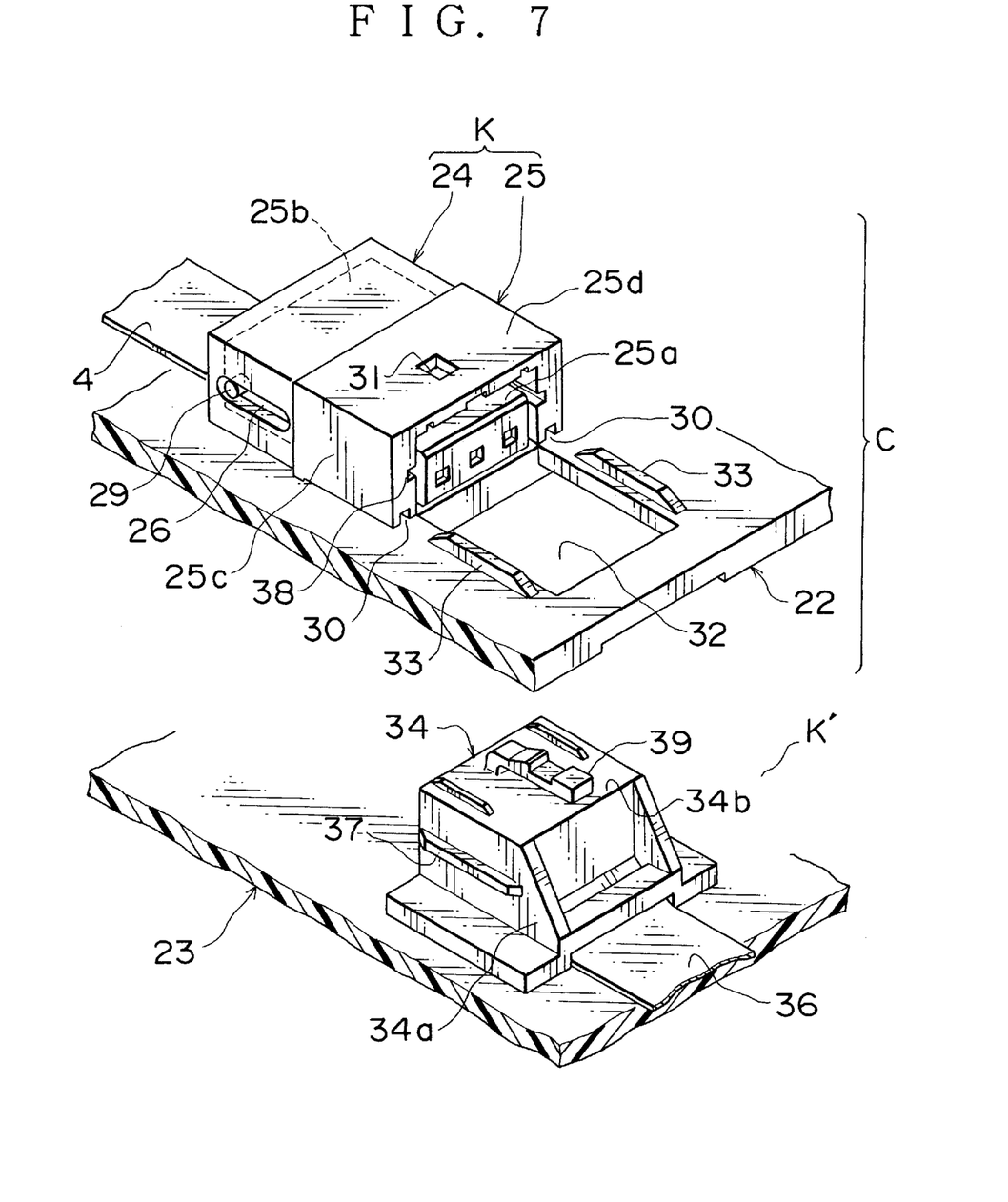
FIG. 7 is a perspective view showing an essential part of the roof module assembly having a fixing connector according to the embodiment of the present invention.

FIG. 7 is a perspective view, according to the embodiment of the present invention of the essential portion of a roof module assembly C having a connector which also serves as a fixture.

The roof module assembly C has a structure being combined or coupled an assemblage board 22 with an overhead mount 23 where in, as a coupling means therefore, a pair of connector fixtures K and K' are provided and one K of which is connected with the assemblage board 22 and the other K' is provided on the overhead mount 23.

By engaging the connector fixtures K and K' with each other, the assemblage board 22 and the overhead mount 23 are coupled and fixed together and, at the same time, the electric circuit is connected.

The connector K consists of a connector housing 24, which is integrally formed with the assemblage board 22 in to a unit, and a movable housing 25, which is capable of being attached or detached to/from the connector housing 24.

Figure 8:
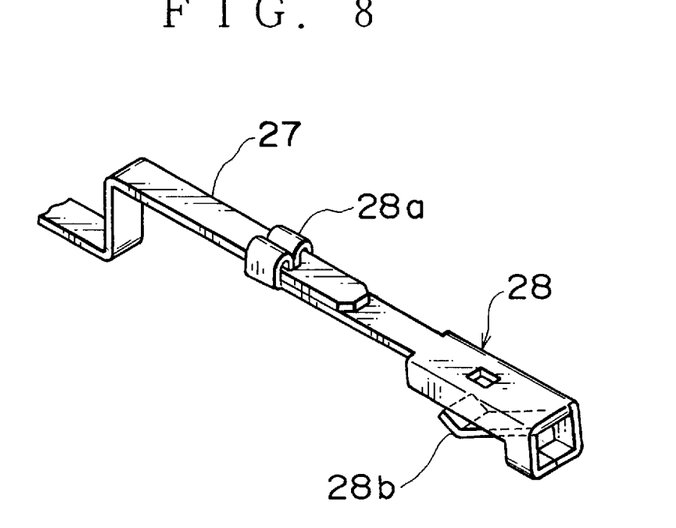
FIG. 8 is a perspective view of terminals and moving contactors contained in the fixing connector of FIG. 7.

Elongated slide slots 26, to act as guide channels, are formed in side walls 24a of the connector housing 24, and a plurality of male terminals 27 are so arranged in parallel that their free ends face to the connector housing 25 as shown in FIG. 8.

Cylindrical movable contactors 28 are slidably fitted onto the individual male terminals 27. Each of the movable contactors 28 provided by bending a thin metal plate has a slide support 28a for holding the terminal 27 at one end and a projecting electric contact portion 28b at the lower side of the other end. The terminals 27 are connected to the modular circuit block 4 to act as a circuit conductor (see FIG. 11).

Figure 9:
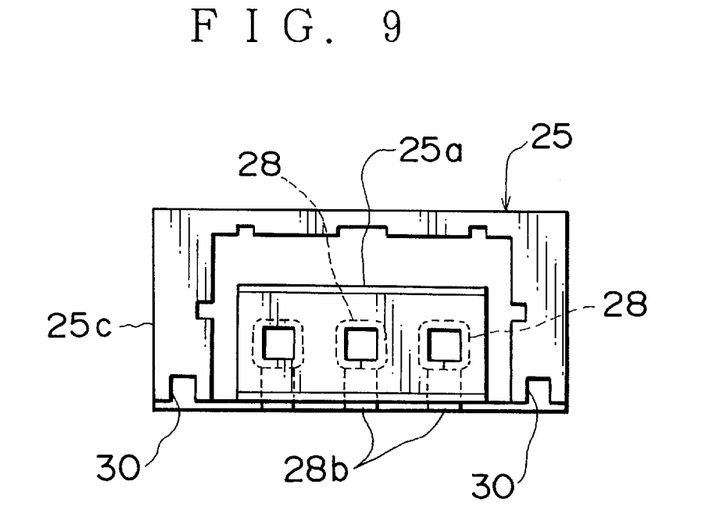
FIG. 9 is a front view of a movable housing of FIG. 7.

At the front of the movable housing 25, a terminal accommodating chamber 25a to contain the movable contactors 28 is provided as seen in FIG. 9 and that, at the rear portion, an insertion portion 25b. The insertion portion 25b is inserted into the connector housing 24, and protrusions 29 formed at the side walls of the insertion portion 25b are fitted into the slide slots 26 of the connector housing 24, so that the movable housing 25 can be connected to and separated from the connector housing 24.

Guide grooves 30 are formed at the lower portion of the side walls 25c of the movable housing 25 and an engagement hole 31 is formed at the top wall 25d thereof.

An engagement opening 32 is formed in the assemblage board 22 in front of the movable housing 25, and protrusions 33 which will fit into the guide groves 30 of the movable housing 25 are formed on both side edges of the engagement opening 32.

The other connector K' is provided by arranging a plurality of electric pieces (see FIG. 11) in parallel at the inside of a box type connector housing 34, and the connector K' is placed in such a position where corresponds to the engagement opening 32 of the assemblage board 22. The electric contact pieces 35 are connected to the end of a flexible flat cable 36 installed in the overhead mount 23.

Introducing protrusions 37 formed at the both side walls 34a of the connector housing 34 are fitted into guide grooves 38 which are formed in the internal walls of the movable housing 25. A locking arm 39 having an engagement protrusion 39a is formed on the top wall 34b of the connector housing 34 to engage with the engagement hole 31 of the movable housing 25 and hold the connector housing 34 and the movable housing 25 together.

Figure 10:
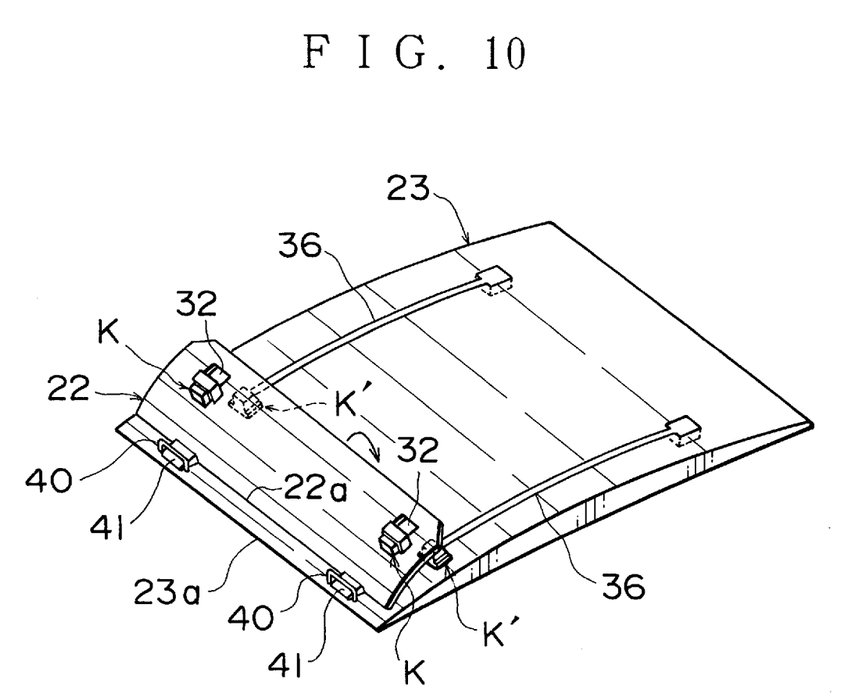
FIG. 10 is an explanatory diagram illustrating a procedure employed in coupling the assemblage board with the overhead mount of FIG. 7.
Figure 11:
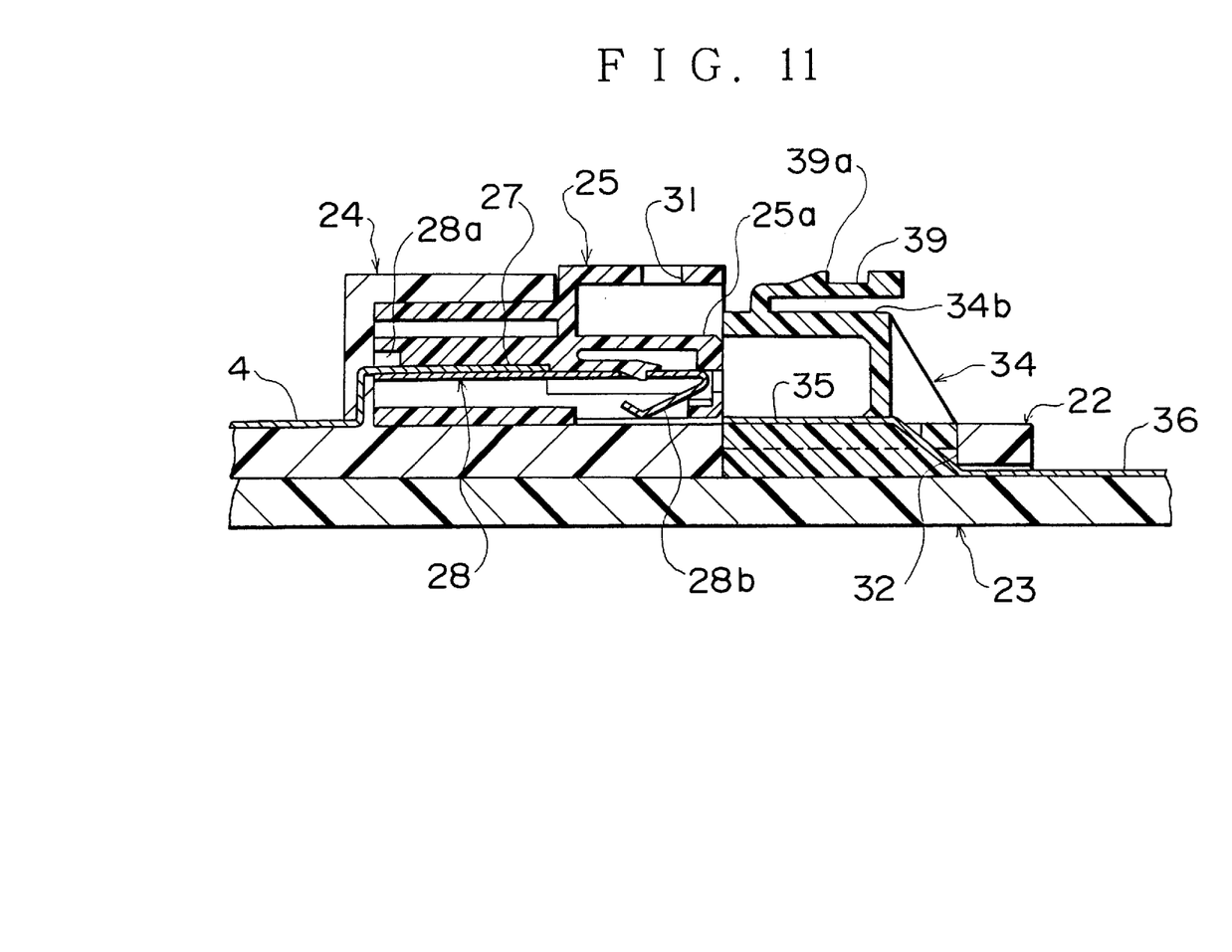
FIG. 11 is a cross-sectional view showing a state of the fixing connectors of FIG. 10 prior to engaging with each other.

As shown in FIG. 10, for the engagement of the connectors K and K', firstly, engagement claws 41 formed at the front edge 22a of the assemblage board 22 are inserted into engagement frames 40 at the front end 23a of the overhead mount 23, and are held temporarily. Secondly, by rotating the assemblage board 22 about the engagement frames 40 into a direction indicated by an arrow, the connector housing 34 of the connector K provided on the overhead mount 23 is inserted into the engagement opening 32 of the assemblage board 22, and the connector housing will protrude above the assemblage board 22 as shown in FIG. 11.

Figure 12:
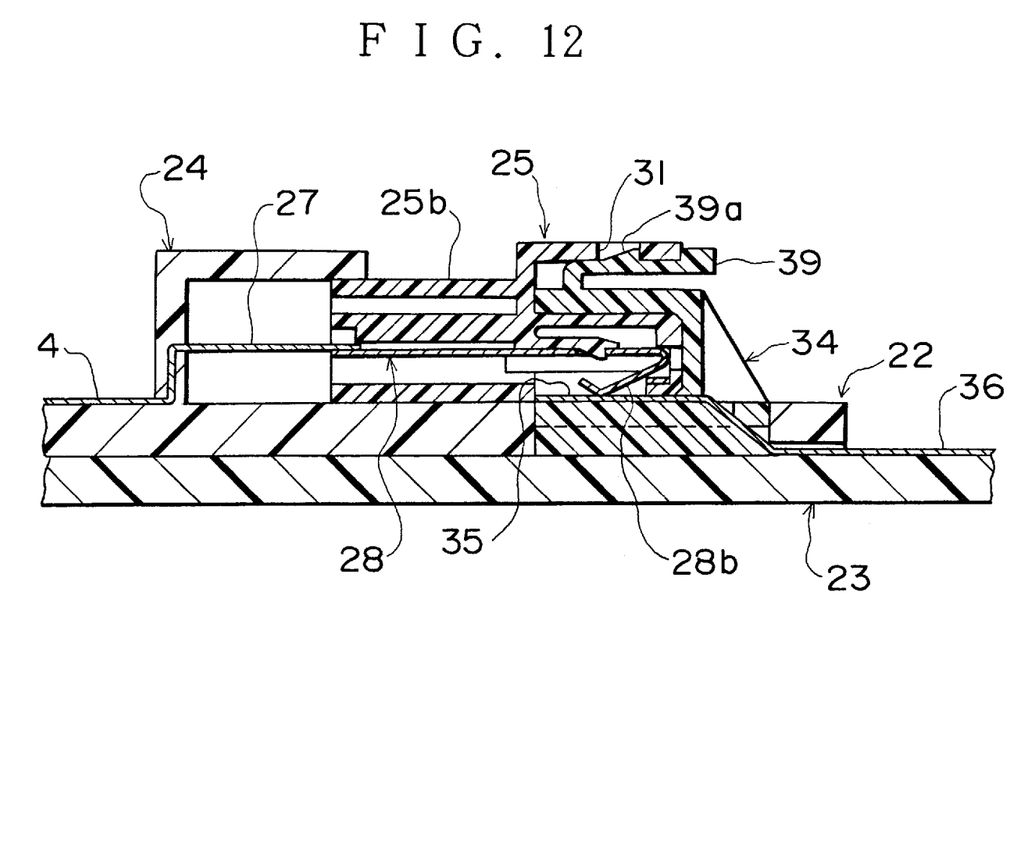
FIG. 12 is a cross-sectional view showing a state of the fixing connectors of FIG. 10 after being engaged with each other.

When, in this condition, the movable housing 25 is slid toward the connector housing 34, as shown in FIG. 12, the connector housing 34 is fitted into the movable housing 25 and, at the same time, the terminal accommodating chamber 25a of the movable housing 25 enters into the connector housing 34. As the terminal container 25a continues its moving, each of the movable contacts 28 in the terminal container 25a is slid forward along the respective terminals 27, and the electric contacts 28b of the movable contactors 28 contact with the electric contactors 35 in the connector housing 34, so that an electric connection is performed. Since a length of the respective terminals 27 is long enough, even when the moving contacts 28 enter into the connector housing 34, an adequate electrical connection can be maintained.

When the movable housing 25 has fully engaged with the connector housing 34, the protrusion 39a of the locking arm 39 is fitted into the engagement hole 32 of the movable housing 25 and secures the movable housing 25 to the connector housing 34 and also couples the assemblage board 22 and the overhead mount 23 with each other.

Thus, the mutual connection of the connectors K and K' simultaneously secures the assemblage board 22 onto the overhead mount 23 and performs an electrical connection between the electric circuits.

According to the present invention, the shape of an assemblage board conforms to that of the front portion of the ceiling of a motor vehicle body at the driver's seat side, and inner equipments, electric accessories, a control unit for controlling the electric accessories, and circuit conductors for connecting these components are collectively mounted on the assemblage board. Thus, there is provided a roof module shortened in length such as having a fraction of total length of the ceiling of the motor vehicle.

As a result, it is also possible to mount a sunroof to the ceiling of the motor vehicle body without changing the structure of the module, and a module can be manufactured in advance without regardless of types of optional electric accessories which are to be attached to the ceiling of the motor vehicle body. Therefore, it is easy to modify the configuration of electric accessories so that it conforms to the type and grade of the motor vehicle.

Since the control unit for controlling the electric accessories is provided, not only the electric accessories mounted on the ceiling, but also electric accessories mounted at locations other than the ceiling, e.g., an electric accessory (a door locking device) installed in a door, can be manipulated. The controls for electric accessories can be installed at positions within a driver's reach for operation.

In addition, since the inner equipments, and the electric accessories and the electric wiring for them which are to be installed on the ceiling of a motor vehicle are collectively mounted on the assemblage board, the required wiring can be reduced and the assembly can be manufactured at a factory in advance. Thus the work involved in the mounting process is simplified and the exhausting labor during which a worker is forced to keep the overhead position is drastically reduced. For the mounting process there is a considerable productivity improvement, especially since an assemblage board and an overhead mount on which a fixture connector is mounted are further simplify in such mounting. The present invention can therefore provide the many advantages described above.

What is claimed is:

1. A structure for assembling a roof module for a motor vehicle comprising:

an assemblage board formed into a shape which conforms to a shape of a front portion of a ceiling of a motor vehicle at a driver's side, said assemblage having inner equipments of said motor vehicle, electric accessories, electric circuits therefore and connectors for providing a connection with an external electric circuit, wherein said electric accessory further includes an antenna for receiving electromagnetic waves from radio stations and motor vehicle navigation systems, and wherein said roof module and an overhead mount are assembled in parallel with each other and are mounted on said ceiling of said motor vehicle;

wherein said overhead mount is attached to said assemblage board for forming a unit together with said inner equipments of said motor vehicle; and wherein a first connector of a pair of connectors which engage with each other and also act as fixtures is provided on said assemblage board of said roof module, and a second connector of said pair of connectors is mounted on said overhead mount, whereby said assemblage board couples with said overhead mount and circuits installed in said overhead mount connect with said electric circuits mounted on said assemblage board simultaneously with said connectors engaging with each other.

2. A structure for assembling a roof module for a motor vehicle comprising:

an assemblage board formed into a shape which conforms to a shape of a front portion of a ceiling of a motor vehicle at a driver's side, said assemblage board having inner equipments of said motor vehicle, electric accessories, electric circuits therefore and connectors for providing connection with an external electric circuit, wherein said electric accessory further includes an antenna for receiving electromagnetic waves from radio stations and motor vehicle navigation systems, wherein said antenna also receives signals from GPS satellites for said motor vehicle navigation systems, and wherein said roof module and an overhead mount are assembled in parallel with each other and mounted on said ceiling of said motor vehicle;

wherein said overhead mount is attached to said assemblage board for forming a unit together with said inner equipments of said motor vehicle; and wherein a first connector of a pair of connectors which engage with each other and also act as fixtures is provided on said assemblage board of said roof module, and a second connector of a pair of connectors is mounted on said overhead mount, whereby said assemblage board couples with said overhead mount and circuits installed in said overhead mount connect with said electric circuits mounted on said assemblage board simultaneously with said connectors engaging with each other.

3. A structure for assembling a roof module for a motor vehicle comprising:

an assemblage board formed into a shape which conforms to a shape of a front portion of a ceiling of a motor vehicle at a driver's side, said assemblage board having inner equipments of said motor vehicle, electric accessories, electric circuits therefore and connectors for providing a connection with an external electric circuit, wherein said electric accessory further includes a multiplex control unit, lamps, receiver section, multiplex control board and switch assembly, and wherein said roof module and an overhead mount are assembled in parallel with each other and are mounted on said ceiling of said motor vehicle;

wherein said overhead mount is attached to said assemblage board for forming a unit together with said inner equipments of said motor vehicle; and wherein a first connector of a pair of connectors which engage with each other and also act as fixtures is provided on said assemblage board of said roof module, and a second connector of said pair of connectors is mounted on said overhead mount, whereby said assemblage board couples with said overhead mount and circuits installed in said overhead mount connect with said electric circuits mounted on said assemblage board simultaneously with said connectors engaging with each other.

4. A structure for assembling a roof module for a motor vehicle comprising:

an assemblage board formed into a shape which conforms to a shape of a front portion of a ceiling of a motor vehicle at a driver's side, said assemblage board having inner equipments of said motor vehicle, electric accessories, electric circuits therefore and connectors for providing a connection with an external electric circuit, wherein said electric accessory further includes an antenna for receiving electromagnetic waves from radio stations and motor vehicle navigation systems, wherein said electric accessory further includes a multiplex control unit, lamps, receiver section, multiplex control board and switch assembly, and wherein said roof module and an overhead mount are assembled in parallel with each other and mounted on said ceiling of said motor vehicle;

wherein said overhead mount is attached to said assemblage board for forming a unit together with said inner equipments of said motor vehicle; and wherein a first connector of a pair of connectors which engage with each other and also act as fixtures is provided on said assemblage board of said roof module, and a second connector of said pair of connectors is mounted on said overhead mount, whereby said assemblage board couples with said overhead mount and circuits installed in said overhead mount connect with said electric circuits mounted on said assemblage board simultaneously with said connectors engaging with each other.

5. A structure for assembling a roof module for a motor vehicle comprising:

an assemblage board formed into a shape which conforms to a shape of a front portion of a ceiling of a motor vehicle at a driver's side, said assemblage board having inner equipments of said motor vehicle, electric accessories, electric circuits therefore and connectors for providing a connection with an external electric circuit, wherein said electric accessory further includes an antenna for receiving electromagnetic waves from radio stations and motor vehicle navigation systems, wherein said antenna also receives signals from GPS satellites for said vehicle navigation systems, wherein said electric accessory further includes a multiplex control unit, lamps, receiver section, multiplex control board and switch assembly, and wherein said roof module and an overhead mount are assembled in parallel with each other and mounted on said ceiling of said motor vehicle;

wherein said overhead mount is attached to said assemblage board for forming a unit together with said inner equipments of said motor vehicle; and wherein a first connector of a pair of connectors which engage with each other and also act as fixtures is provided on said assemblage board of said roof module, and a second connector of said pair of connectors is mounted on said overhead mount, whereby said assemblage board couples with said overhead mount and circuits installed in said overhead mount connect with said electric circuits mounted on said assemblage board simultaneously with said connectors engaging with each other.

* * * * *